United States Patent

Bozoian

[15] 3,648,062
[45] Mar. 7, 1972

[54] WIDE-BAND NONINDUCTIVE FREQUENCY DOUBLER

[72] Inventor: Michael Bozoian, Ann Arbor, Mich.
[73] Assignee: Ford Motor Company, Dearborn, Mich.
[22] Filed: Nov. 16, 1970
[21] Appl. No.: 89,974

[52] U.S. Cl............................307/220, 307/261, 307/262, 307/271, 321/47, 324/119, 328/20, 328/26, 328/32
[51] Int. Cl.........................................................H03b 19/14
[58] Field of Search.................307/220, 225, 260, 261, 262, 307/271; 328/20, 26, 32; 324/119; 321/47

[56] References Cited

UNITED STATES PATENTS

| 3,564,295 | 2/1971 | Slaats | 307/271 X |
| 3,258,609 | 6/1966 | Verstraelen | 307/261 X |
| 3,400,333 | 9/1968 | Inose | 307/220 X |
| 3,419,787 | 12/1968 | Baehre | 321/47 X |
| 3,566,247 | 2/1971 | Golembeski | 321/47 X |

OTHER PUBLICATIONS

Handbook Preferred Circuits Navy Aeronautical Electronic Equipment, Vol. II, Semiconductor Device Circuits, Apr. 1962, pp. 18-2 & 19-2.
A Symmetrical- Transistor Steering Circuit, J. L. Walsh, IBM Journal, Apr. 1957, pp. 185- 188.

Primary Examiner—Stanley T. Krawczewicz
Attorney—John R. Faulkner and Keith L. Zerschling

[57] ABSTRACT

A wide-band noninductive electronic frequency double including a single transistor connected in emitter-follower configuration. Resistor means are connected to the base electrode of the transistor and a source of electrical energy for applying a heavy forward bias to the base. The output terminal for the frequency doubler is positioned intermediate the collector electrode of the transistor and a resistor that connects the collector to the source of electrical energy. Frequency-doubling occurs as a result of the cumulative effect of the heavy forward bias and the emitter-follower action of the transistor.

11 Claims, 3 Drawing Figures

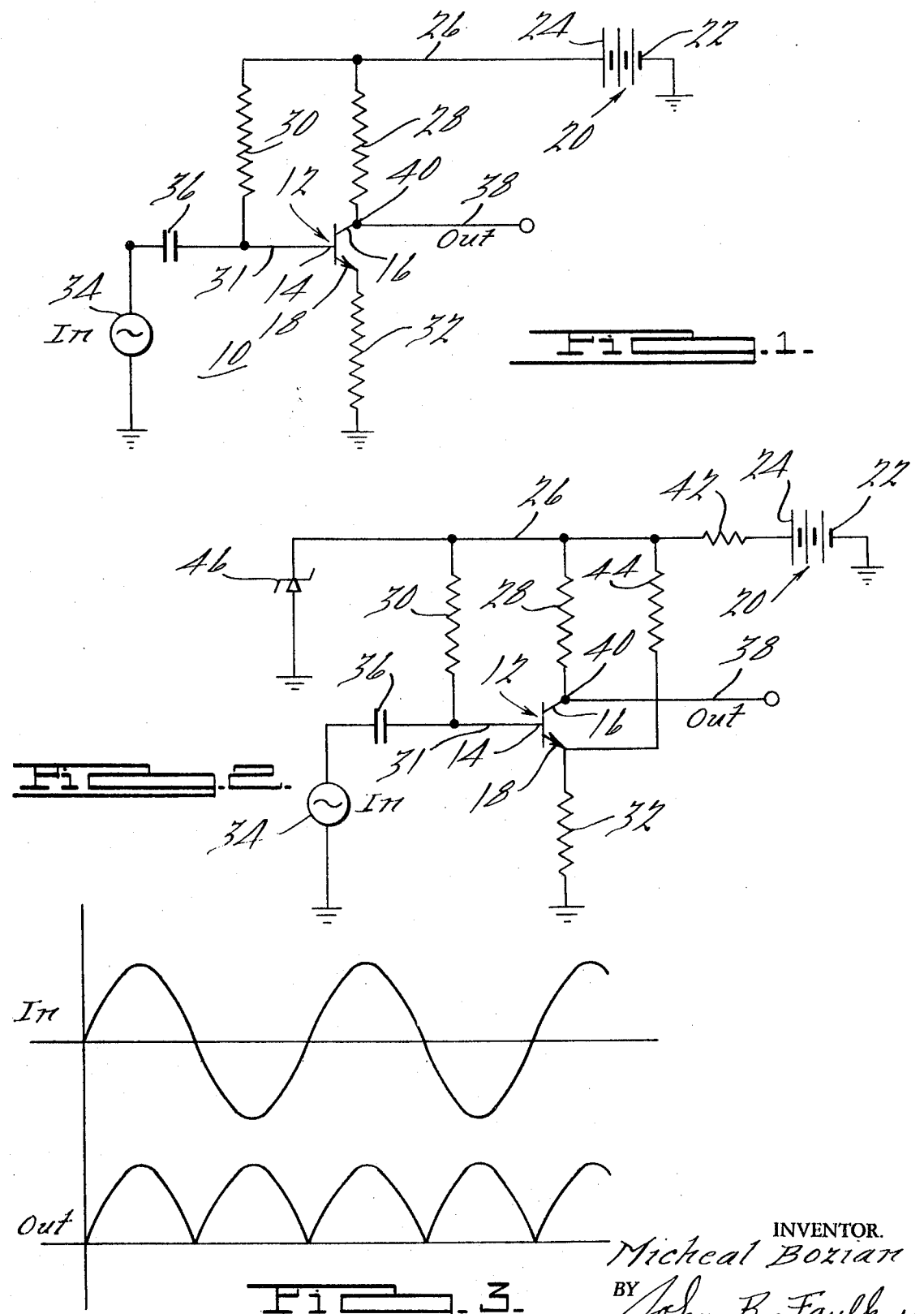

3,648,062

WIDE-BAND NONINDUCTIVE FREQUENCY DOUBLER

BACKGROUND OF THE INVENTION

This invention relates to a wide-band, noninductive frequency doubler and, more particularly, to a single-stage transistor circuit having frequency-doubling properties.

While not so limited, the single-stage-transistor frequency doubler of the present invention was developed specifically for use in speed-related products, such as electronic speedometers, speed control and antiskid systems. In these systems, a speed sensor, for example, a small electric alternator driven by a rotating part of an automotive vehicle is used. Thus, the speed of a vehicle utilizing these systems is related to the output frequency of the alternator and the change in frequency may control these various systems.

A problem encountered in these systems of speed measurement or control occurs at low speeds where the alternating frequency output of the small electric alternator is so low that steady output from a frequency to voltage converter connected to the alternator is often difficult to attain because only a finite number of poles can be employed on a practical alternator motor.

The use of the single-stage-transistor frequency doubler of the present invention provides a number of advantages when used in the speed-related products and systems mentioned above. These advantages are: (1) the extension of proper performances of a given speed sensor to lower speed levels, and/or an attendant decrease in the cost of a sensor rotor since a rotor with half the number of poles may be employed; (2) the doubling of the output frequency of a given sensor permits the use of smaller capacitors in the frequency to voltage converter, connected to the doubler, for a given frequency and the same level of output ripple; and (3) when the speed sensor is employed as part of the servomechanism, as it is in speed control systems, doubling of the output frequency may remove unwanted resonance effects in the output actuators of the servomechanism.

Electronic noninductive frequency doublers are known in the art. Examples of these prior art frequency doublers are found in U.S. Pat. Nos. 2,770,728; 2,829,253; 3,093,752; 3,202,840; and 3,419,787.

The present invention, which utilizes a single-stage transistorized circuit to provide the frequency doubling, is much simpler and much less complicated than any of the frequency-doubling circuits shown in these patents. Consequently, it has cost and reliability advantages over these frequency doublers. In addition the frequency-doubling principles of the present invention are entirely different from those disclosed in these prior art patents.

SUMMARY OF THE INVENTION

The present invention provides a single-stage-transistor frequency doubler in which resistor means are connected to the emitter of the transistor and the first terminal of a source of direct current electrical energy for connecting the transistor in an emitter-follower configuration. A second resistor means is connected to the second terminal of the source of direct current electrical energy and to the base of the transistor for applying a heavy forward bias to the base, and a third resistor means is connected to the collector electrode of the transistor and to this second terminal of the source of direct current electrical energy. Input circuit means are connected to the base electrode and to the first terminal of the source of direct current electrical energy for applying an alternating current input signal to the base of the transistor. An output terminal is connected intermediate the collector of the transistor and the third resistor means.

The combined action of the heavy forward bias on the transistor and the emitter-follower action results in doubling the frequency of the alternating current input signal.

Additionally, in a second embodiment of the invention, a resistor is connected to the emitter of the transistor and to the second terminal of the source of direct current electrical energy to provide symmetry in the output signal from the collector. Moreover, a zener diode may be connected across the source of direct current electrical energy for providing voltage-regulating means for this transistorized circuit.

An object of the present invention is the provision of a simplified and inexpensive wide-band, noninductive frequency doubler.

A further object of the invention is the provision of a single-stage transistor circuit having frequency-doubling properties that operates over a wide range of frequencies without the use of inductors, transformers, filters and other similar circuit elements.

Other objects and attendant advantages of the present invention may be readily realized when the specification is considered in connection with the attached drawings.

BRIEF DESCRIPTION OF THE DRAWINGS

FIG. 1 is a circuit diagram of the frequency doubler of the present invention;

FIG. 2 is a circuit diagram of a modified form, or different embodiment, of the frequency doubler of the present invention; and FIG. 3 is an illustration of the waveforms of input and output signals of the frequency doubler shown in FIGS. 1 and 2.

DESCRIPTION OF THE PREFERRED EMBODIMENTS

Referring now to the drawings, in which like reference numerals designate like parts throughout the several views thereof, there is shown in FIG. 1 a transistorized frequency doubler 10 comprising a single transistor 12 having a base 14, a collector 16 and an emitter 18. This frequency doubler 10 is supplied with electrical energy from a source of direct current electrical energy 20 having a first or negative terminal 22 connected to ground and a second or positive terminal 24 connected to line 26. The line 26 is in turn connected to the collector 16 of transistor 12 through resistor 28 and to base 14 through a resistor 30. The emitter 18 is connected to ground or to the first terminal 22 of the source of direct current electrical energy 20 through a resistor 32, thereby connecting the transistor 12 in an emitter-follower configuration.

An input signal source 34, producing an alternating current signal, has one terminal connected to ground and, hence, the first or negative terminal 22 of the source of direct current electrical energy 20 and the other terminal connected through capacitor 36 and lead 31 to the base 14 of the transistor 12. An output line 38 is connected at a junction 40 intermediate the collector 16 and the resistor 28.

The embodiment of the invention shown in FIG. 2 includes all of the components described and shown in relation to FIG. 1. Additionally, a dropping resistor 42 is connected in series with the second or positive terminal 24 of the source of direct current electrical energy 20 and the line 26. Moreover, a resistor 44 is connected between line 26 and the emitter 18 of the transistor 12. A voltage-regulating zener diode 46 is connected at one terminal to the line 26 and at the other terminal to ground or the first or negative terminal 22 of the source of direct current electrical energy 20.

Typical values of the components used in the present invention are given below. It is to be understood that these values are given by way of example only and that other values of the various components may readily be employed.

| Transistor 12 | MPS-6515 |
|---|---|
| Resistor 28 | 10 kΩ |
| Resistor 30 | 22 kΩ |
| Resistor 32 | 10 kΩ |
| Capacitor 36 | 5 microfarads |
| Resistor 42 | 180 ohms |
| Resistor 44 | 39 kΩ |
| Zener Diode 46 | MZ-1,000-13 |

The voltage of the source of electrical energy 20 shown in FIG. 1 may be in the range of 10 to 16 volts for satisfactory operation of the frequency doubler shown in FIG. 1, while the voltage of the source of electrical energy 20 shown in FIG. 2 may range from 10 to 20 volts for satisfactory operation of the frequency doubler shown in FIG. 2.

From the values given above, it can be readily appreciated that the values of the resistors 28 and 32 are approximately equal. The value of the resistor 30, when considered in connection with the values of resistors 28 and 32, provides a heavy forward bias on transistor 12, thus biasing it into a heavily conducting state.

In operation of the frequency doubler shown in FIG. 1, the input signal source 34 applies to the base 14 of transistor 12 an alternating current signal which may take the form of the alternating voltage or current wave designated "IN" in FIG. 3. The output signal appearing on line 38 is the voltage or current waveform designated "OUT" in FIG. 3. It can be readily appreciated from the examination of FIG. 3 that the frequency of the output signal appearing on the line 38 is double the frequency of the alternating current signal produced by the signal source 34, and that AC to DC conversion has taken place.

With respect to FIG. 2, the additional resistor 44 connected between line 26 and the emitter 18 of transistor 12 provides symmetry of the output waveform designated "OUT" in FIG. 3. Additionally, the voltage-regulating zener diode 46 may be employed here to provide a regulated voltage for the transistor 12.

The frequency-doubling action of the present invention has been observed using the frequency doubler circuit shown in FIG. 1. With the terminal voltage of the direct current source of electrical energy 20 equal to 10 volts, a sine wave input from the input signal source 34 having a peak to peak amplitude of 2 volts was applied to the base 14 of transistor 12. A similar sine wave having a peak to peak voltage of 2 volts was observed at the emitter 18. Of greater significance and interest, however, frequency doubling was observed at the collector 16. The waveform shown in FIG. 3 designated "OUT" was observed having a peak to peak amplitude of approximately 1 volt.

The negative portion of the input sine wave appeared at the collector 16 as a positive output in accordance with conventional circuit theory. However, the positive portion of the input sine wave instead of appearing as a negative pulse at the collector, as would be predicted by conventional circuit theory, also appeared at the collector 16 as a positive pulse. It is believed that this phenomenon occurs as a result of the cumulative effect of the heavy forward bias on the transistor 12 and the emitter-follower action of this transistor.

Thus, the present invention provides a wide-band noninductive frequency doubler employing a single-stage transistor circuit. This frequency doubler employs a very minimum of electrical and electronic components and, hence, is reliable and inexpensive, as well as being capable of simple and ready construction and assembly.

I claim:

1. An electronic frequency doubler comprising a single transistor having a base, an emitter and a collector connected in an emitter-follower configuration, a source of electrical energy, means connected to said source of electrical energy and said base for biasing said transistor into a heavily conducting condition and a resistor connected intermediate said source of electrical energy and said collector, an input circuit coupled to said base and emitter and an output terminal connected intermediate said collector and resistor.

2. The combination of claim 1 and further comprising a resistor connected between said source of electrical energy and said emitter of said transistor.

3. The combination of claim 2 and further comprising a zener diode connected across said source of electrical energy.

4. An electronic frequency doubler comprising a single transistor having a base, an emitter and a collector, a source of direct current electrical energy having a first terminal and a second terminal, resistor means connected to said emitter and said first terminal of said source of direct current electrical energy for connecting said transistor in an emitter-follower configuration, second resistor means connected to said second terminal of said source of electrical energy and said base for applying a heavy forward bias to said base with respect to said emitter, a third resistor means connected to said collector electrode and said second terminal of said source of direct current electrical energy, input circuit means connected to said base electrode of said transistor and to said first terminal of said source of direct current electrical energy and an output terminal connected intermediate said collector and said third resistor means.

5. The combination of claim 4 and further comprising a fourth resistor means connected between said second terminal of said source of direct current electrical energy and said emitter electrode of said transistor.

6. The combination of claim 5 and further comprising voltage-regulating means in the form of a zener diode connected to said first and second terminals of said source of electrical energy.

7. The combination of claim 4 in which the values of the resistance of said second resistor means and said third resistor means are approximately equal.

8. The combination of claim 7 and further comprising a fourth resistor means connected between said second terminal of said source of direct current electrical energy and said emitter electrode of said transistor.

9. The combination of claim 8 and further comprising voltage-regulating means in the form of a zener diode connected to said first and second terminals of said source of direct current electrical energy.

10. An electronic frequency doubler comprising as its only active element a single transistor having a base, an emitter and a collector connected in an emitter-follower configuration, a source of electrical energy, means connected to said source of electrical energy and said base for biasing said transistor into a heavily conducting condition and a resistor connected intermediate said source of electrical energy and said collector, an input circuit coupled to said base and emitter and an output terminal connected intermediate said collector and resistor.

11. An electrical frequency doubler comprising a single transistor having a base, an emitter and a collector, passive bilateral circuit elements only constituting the remainder of said electronic frequency doubler, a source of electrical energy, said passive bilateral circuit elements comprising means connected to said source of electrical energy and said base for biasing said transistor into a heavily conducting condition and means for connecting said transistor in an emitter-follower configuration, an input circuit coupled to said base and emitter and an output circuit coupled to said collector.

* * * * *